(12) United States Patent
Huang et al.

(10) Patent No.: US 10,785,559 B2
(45) Date of Patent: Sep. 22, 2020

(54) METHOD AND DEVICE FOR SWITCHING PLAY MODES OF WIRELESS SPEAKER, AND WIRELESS SPEAKER

(71) Applicant: SHENZHEN GRANDSUN ELECTRONIC CO., LTD., Shenzhen, Guangdong OT (CN)

(72) Inventors: Rongfang Huang, Shenzhen (CN); Haiquan Wu, Shenzhen (CN); Weifeng Gu, Shenzhen (CN); Enqin Zhang, Shenzhen (CN); Lei Cao, Shenzhen (CN); Ruiwen Shi, Shenzhen (CN)

(73) Assignee: SHENZHEN GRANDSUN ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 16/364,123

(22) Filed: Mar. 25, 2019

(65) Prior Publication Data

US 2019/0297415 A1    Sep. 26, 2019

(30) Foreign Application Priority Data

Mar. 26, 2018 (CN) .......................... 2018 1 0250963

(51) Int. Cl.
*H04R 29/00* (2006.01)
*H04R 1/28* (2006.01)
(Continued)

(52) U.S. Cl.
CPC ....... *H04R 1/2888* (2013.01); *G06K 9/00268* (2013.01); *G06K 9/00288* (2013.01);
(Continued)

(58) Field of Classification Search
CPC ...... H04R 1/2888; H04R 1/083; H04R 1/406; H04R 2420/07; H04R 29/001;
(Continued)

(56) References Cited

U.S. PATENT DOCUMENTS

| 2009/0138805 A1* | 5/2009 | Hildreth | ............. G06K 9/00335 |
| | | | 715/745 |
| 2013/0058503 A1* | 3/2013 | Kato | ........................ H04R 3/04 |
| | | | 381/107 |

(Continued)

FOREIGN PATENT DOCUMENTS

| CN | 103177750 A | 6/2013 |
| CN | 104053060 A | 9/2014 |
| TW | 201327369 A | 7/2013 |

OTHER PUBLICATIONS

Extended European Search Report for EP Application No. 19165081 dated Jun. 15, 2019. 9 pages.

*Primary Examiner* — Disler Paul (74) *Attorney, Agent, or Firm* — Loza & Loza, LLP; Michael F. Fedrick (57) ABSTRACT

The present application is applicable to the technical field of intelligent home, and provides a method and a device for switching play modes of a wireless speaker, and a wireless speaker. The method for switching play modes of a wireless speaker includes: acquiring user information in a current application scenario by the camera and/or the microphone array; and controlling the wireless speaker to switch into a play mode corresponding to the user information. The embodiments of the present application can automatically switch the play modes according to the application scenario, thereby improving the switching efficiency, reducing the waiting time of the user, and having strong ease of use and practicability.

12 Claims, 5 Drawing Sheets

(51) Int. Cl.
  *G06K 9/00* (2006.01)
  *H04R 1/08* (2006.01)
  *H04R 1/40* (2006.01)
  *H04R 1/00* (2006.01)
  *H04S 7/00* (2006.01)

(52) U.S. Cl.
  CPC ............... *H04R 1/00* (2013.01); *H04R 1/083* (2013.01); *H04R 1/406* (2013.01); *H04S 7/30* (2013.01); *H04R 2420/07* (2013.01); *H04S 2400/15* (2013.01)

(58) Field of Classification Search
  CPC ............. H04R 29/008; G06K 9/00268; G06K 9/00288; H04S 7/30; H04S 2400/15; H04S 7/303; H03G 3/20
  USPC ................... 381/56–59, 77–79, 81, 104, 107
  See application file for complete search history.

(56) References Cited

U.S. PATENT DOCUMENTS

| | | | |
|---|---|---|---|
| 2013/0155217 A1 | 6/2013 | Wang | |
| 2014/0003629 A1* | 1/2014 | Reilly | H03G 3/02 381/107 |
| 2014/0064550 A1* | 3/2014 | Wiggins | H04R 1/023 381/391 |
| 2015/0373452 A1* | 12/2015 | Kubota | H04R 1/403 381/97 |
| 2016/0057522 A1* | 2/2016 | Choisel | H04R 1/08 381/92 |
| 2017/0094434 A1* | 3/2017 | Bhogal | H04R 29/001 |

\* cited by examiner

METHOD AND DEVICE FOR SWITCHING PLAY MODES OF WIRELESS SPEAKER, AND WIRELESS SPEAKER

CROSS-REFERENCE TO RELATED APPLICATIONS

This application claims the benefit of priority under 35 U.S.C. § 119 from Chinese Patent Application No. 201810250963.5, filed Mar. 26, 2018. The disclosure of this reference is incorporated herein by reference in its entirety.

TECHNICAL FIELD

The present application generally relates to the technical field of intelligent home, and in particular to a method and a device for switching play modes of a wireless speaker, and a wireless speaker and a computer readable storage medium.

BACKGROUND

At present, the fast-paced life makes people realize that proper entertainment is very effective in relieving life pressure. Therefore, household entertainment consumption is growing rapidly, and speaker equipments rapidly enter into thousands of households.

However, when the user uses a traditional speaker in a large field, it is often necessary to return to the position where the speaker is located to manually switch the play mode of the speaker, and the switching efficiency is low.

SUMMARY

Given this, embodiments of the present application provide a method and a device for switching play modes of a wireless speaker, and a wireless speaker, which can automatically switch the play modes according to the application scenario, thereby improving the switching efficiency.

A first aspect of the embodiments of the present application provides a method for switching play modes of a wireless speaker, the wireless speaker includes a camera and a microphone array, and the method includes:

acquiring user information in a current application scenario by the camera and/or the microphone array; and controlling the wireless speaker to switch into a play mode corresponding to the user information;

wherein the user information includes at least one of: age information of the user, voice information of the user, position information of the user and information of number of the user.

A second aspect of the embodiments of the present application provides a device for switching play modes of a wireless speaker, the wireless speaker includes a camera and a microphone array, and the method includes:

an acquisition module, configured to acquire user information in a current application scenario by the camera and/or the microphone array; and an execution module, configured to control the wireless speaker to switch into a play mode corresponding to the user information;

wherein the user information comprises at least one of: age information of the user, voice information of the user, position information of the user and information of number of the user.

A third aspect of the embodiments of the present application provides a wireless speaker, which includes a memory, a processor and a computer program stored in the memory and executable by the processor, the processor, when executing the computer program, implements the method mentioned in the first aspect.

A fourth aspect of the embodiments of the present application provides a computer readable medium, which includes a computer program stored in the computer readable medium, the computer program, when executed by a processor, implements the method mentioned in the first aspect.

Compared with the prior art, the embodiments of the present application have the beneficial effects that: the embodiments acquire the user information in the current application scenario by the camera and/or the microphone array, and control the wireless speaker to switch into the play mode corresponding to the user information. The embodiments of the present application can automatically switch the play modes according to the application scenario, thereby improving the switching efficiency, reducing the waiting time of the user, and having strong practicability and ease of use.

DESCRIPTION OF THE DRAWINGS

In order to more clearly illustrate the technical solutions in the embodiments of the present application, the drawings used in the description of the embodiments or the prior art will be briefly described below. It is obvious that the drawings in the following description are only some embodiments of the present application, and other drawings may be obtained according to these drawings for those of ordinary skill in the art without any creative work.

DETAILED DESCRIPTION

In the following description, specific details such as a specific system structure and a specific technology are presented for the purpose of illustration rather than limitation, such that embodiments of the present application can be understood thoroughly. However, it should be understood for those skilled in the art that the present application may also be implemented in other embodiments without these specific details. In other instances, detailed descriptions of well-known systems, devices, circuits and methods are omitted to avoid unnecessary details interfering with the description of the present application.

It should be understood that, the term "comprising", when used in the present description and the appended claims, indicates the existence of a feature, an entity, a step, an operation, an element and/or a component, but does not exclude the existence or addition of one or more other feature, entity, step, operation, element, component and/or combination thereof.

It should also be understood that, the terms used in the description of the present application is for the purpose of illustrating particular embodiment but not limiting the present application. As used in the description and the appended claims of the present application, the singular form "single", "one" and "said" are intended to include plural form, unless otherwise clearly specified by the context.

It should be further understood that, the term "and/or" used in the description and the appended claims of the present application means any combination and all possible combinations of one or more of items listed in association.

As used in the description and the appended claims, the term "if" can be interpreted as "when" or "once" or "in response to determining", or "in response to detecting" depending on the context. Similarly, the phrase "if . . . is determined" or "if [condition or event described] is detected" may be interpreted to mean "once . . . is determined" or "in response to determining" or "once [condition or event described] is detected, or "in response to detecting [condition or event described]" depending on the context.

It should be understood that, the size of the serial number of each step in the embodiments does not mean the order of execution, and the order of execution of each step should be determined by its function and internal logic, and should not be construed as limitation to the implementation process of the embodiments of the present application.

It should be noted that the wireless speaker in the present application includes a camera and a microphone array, and the camera and the microphone array are both connected to a main control module.

In order to illustrate the technical solutions described in the present application, the following description will be made by way of specific embodiments.

First Embodiment

Figure 1:
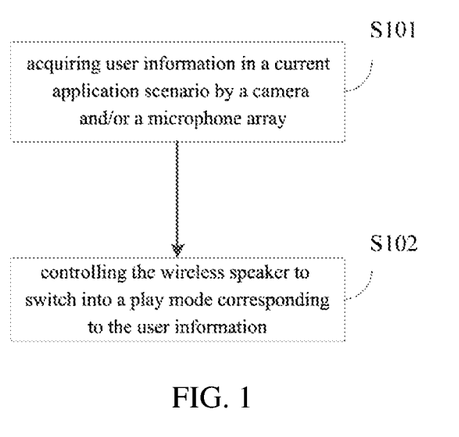
FIG. 1 is a schematic flowchart of the method for switching play modes of a wireless speaker provided by a first embodiment of the present application.

FIG. 1 is a schematic flowchart of the method for switching play modes of a wireless speaker provided by the first embodiment of the present application, and the method may include the following steps of:

S101: acquiring user information in a current application scenario by a camera and/or a microphone array.

In the embodiment of the present application, the user information includes at least one of: age information of the user, voice information of the user, position information of the user, and information of number of the user.

It should be noted that, the age information of the user is mainly used to determine whether the user is an elderly person; the voice information of the user is mainly used to determine whether there is a preset wake-up keyword; the position information of the user is mainly used to determine whether the user's position is at the same side of the wireless speaker; the information of number of the user is mainly used to determine whether there are a plurality of users in the current application scenario.

S102: controlling the wireless speaker to switch into a play mode corresponding to the user information.

In the embodiment of the present application, the play mode includes at least one of the following: a first play mode, a second play mode, a third play mode, a fourth play mode, and a current 360-degree play mode.

Optionally, the wireless speaker comprises: a Wi-Fi speaker.

In the embodiment of the present application, the user information in the current application scenario is acquired by the camera and/or the microphone array, and the wireless speaker is controlled to be switched into the play mode corresponding to the user information, thus the inconvenience problem of needing to manually switch the play mode in the prior art is solved, which improves the switching efficiency and has strong ease of use and practicability.

Second Embodiment

Figure 2:
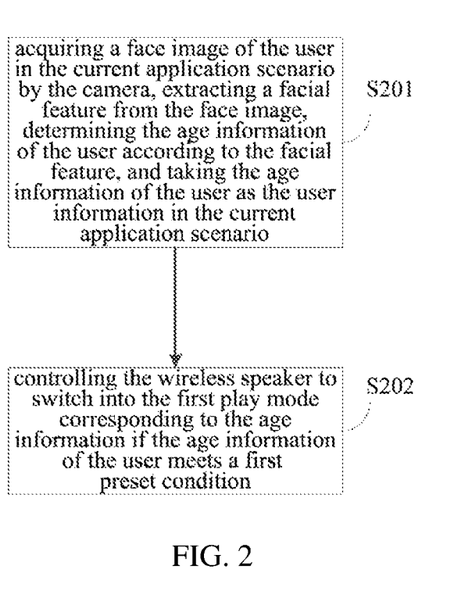
FIG. 2 is a schematic flowchart of the method for switching play modes of a wireless speaker provided by a second embodiment of the present application.

FIG. 2 is a schematic flowchart of the method for switching play modes of a wireless speaker provided by the second embodiment of the present application, which is a further refinement and description of above steps S101 and S102 in the first embodiment, and the method may include the following steps of:

S201: acquiring a face image of the user in the current application scenario by the camera, extracting a facial feature from the face image, determining the age information of the user according to the facial feature, and taking the age information of the user as the user information in the current application scenario.

Where, the age information of the user may be a specific age value, or an age range to which the user belongs.

Optionally, after acquiring the face image of the user within a preset area in the current application scenario, a face recognition algorithm is applied to determine the user's age value or the age range to which the user belongs.

Optionally, a voiceprint recognition technology is combined to further determine the user's age value or the age range to which the user belongs.

S202: controlling the wireless speaker to switch into the first play mode corresponding to the age information, if the age information of the user meets a first preset condition.

Optionally, the first preset condition includes that the age is greater than or equal to 65 years old, and the current 360-degree play mode is switched into the elderly mode if the user's age value or age range is within this range.

Where, the first play mode is the elderly mode, and the elderly mode is mainly for an elderly person whose hearing is not very good. Through increasing, in a fixed direction, the gain of a specific frequency to which the elderly is not sensitive, it is achieved to enhance the play effect of music or a movie, thereby satisfying the need of the elderly to enjoy music or watch movies.

Take a specific application scenario as an example. When an elderly person is alone at home during working days, the wireless speaker acquires the face image of the elderly person through the camera, recognizes the particularity of the user, and automatically switches the current 360-degree play mode to the elderly mode, so as to play drama or radio programs for the elderly individual.

In the embodiment of the present application, the face image of the user in the current application scenario is acquired by the camera, the facial feature from the face image is extracted, the age information of the user is determined according to the facial feature, and the age information of the user is used as the user information in the current application scenario. If the age information of the user satisfies the first preset condition, then the wireless speaker is controlled to switch into the first play mode corresponding to the age information, thereby the inconvenience problem caused by the need to manually switch the play mode in a large field to the slow-moving elderly is solved, which improves the switching efficiency, brings a better experience to the user, and has strong ease of use and practicability.

Third Embodiment

Figure 3:
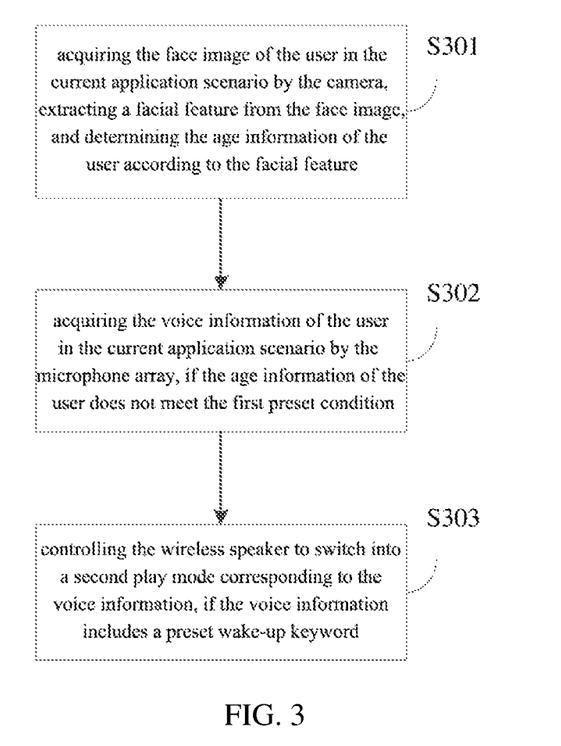
FIG. 3 is a schematic flowchart of the method for switching play modes of a wireless speaker provided by a third embodiment of the present application.

FIG. 3 is a schematic flowchart of the method for switching play modes of a wireless speaker provided by the third embodiment of the present application, which is another refinement and description of above steps S101 and S102 in the first embodiment, and the method may include the following steps of:

S301: acquiring the face image of the user in the current application scenario by the camera, extracting a facial feature from the face image, and determining the age information of the user according to the facial feature.

The above-mentioned step S301 is the same as the step S201 of the second embodiment, and will not be repeated here.

S302: acquiring the voice information of the user in the current application scenario by the microphone array, if the age information of the user does not meet the first preset condition.

Where, the wireless speaker monitors the voice information around the environment through the microphone array distributed around the shell of the body. When the voice information is monitored, a built-in wake-up word detection module detects whether wake-up information is included.

S303: controlling the wireless speaker to switch into a second play mode corresponding to the voice information, if the voice information includes a preset wake-up keyword.

Optionally, the preset wake-up keyword is a common sensitive vocabulary. It should be understood that, after the wireless speaker is successfully awakened, the user can consult the speaker for topics of interest to them, such as consulting the weather, consulting current affairs, and the like.

Where, the second play mode is a follow mode, and the follow mode means that the direction of the wireless speaker follows the source direction of the user's voice. It should be understood that the follow direction under the follow mode may vary multiple times as the direction of the user's voice changes.

It should be noted that the wireless speaker under the follow mode may provide a cloud service function for the user, for example, answering a question raised by the user in the direction in which the user is located.

Take a specific application scenario as an example. After a mother awakens the wireless speaker through the preset wake-up information in a certain direction and consults for the weather of tomorrow, the wireless speaker automatically switches into the follow mode once detecting the preset wake-up information, and answers in the direction of the voice source.

In the embodiment of the present application, the face image of the user in the current application scenario is acquired by the camera, the facial feature from the face image is extracted, and the age information of the user is determined according to the facial feature. If the user's age information does not meet the first preset condition, the voice information of the user in the current application scenario is acquired by the microphone array. If the voice information includes a preset wake-up keyword, the wireless speaker is controlled to switch into the second play mode corresponding to the voice information, where the second play mode is a follow mode. The present embodiment solves the existing problem that the play mode cannot be automatically switched according to the need in the prior art, thereby improving the switching efficiency, bringing the user better experience, and having strong ease of use and practicality.

Fourth Embodiment

Figure 4:
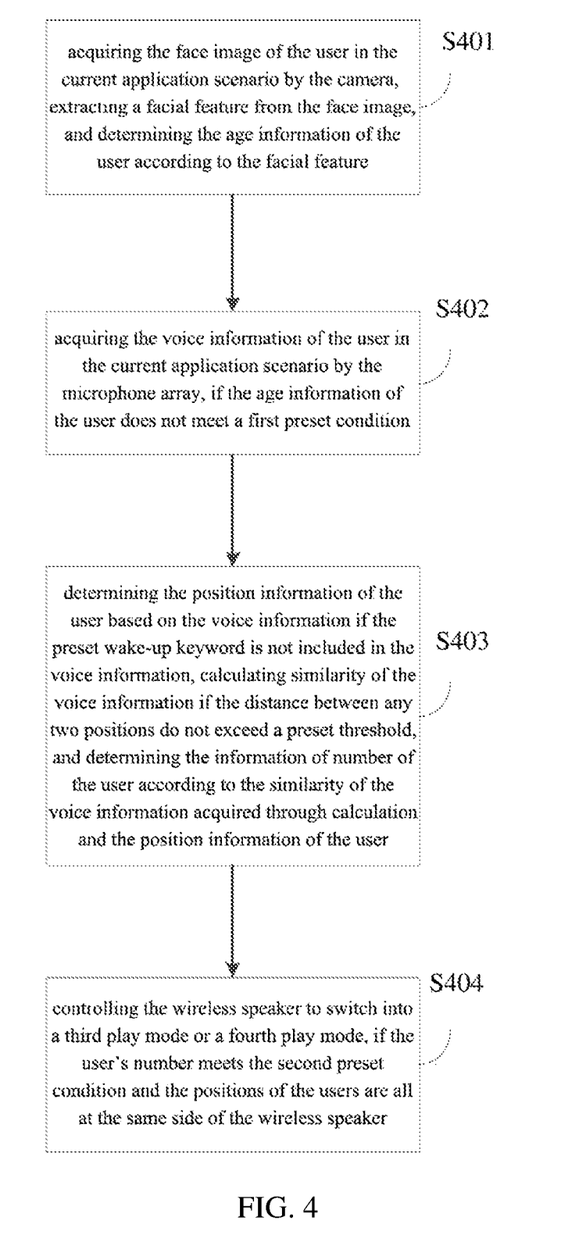
FIG. 4 is a schematic flowchart of the method for switching play modes of a wireless speaker provided by a fourth embodiment of the present application.

FIG. 4 is a schematic flowchart of the method for switching play modes of a wireless speaker provided by the fourth embodiment of the present application, which is again a refinement and description of the steps S101 and S102 in the first embodiment, and the method may include the following steps of:

S401: acquiring the face image of the user in the current application scenario by the camera, extracting a facial feature from the face image, and determining the age information of the user according to the facial feature.

S402: acquiring the voice information of the user in the current application scenario by the microphone array, if the age information of the user does not meet a first preset condition.

Where, the above steps S401-S402 are the same as the steps S301-S302 of the third embodiment, and are not described herein again.

S403: determining the position information of the user based on the voice information if the preset wake-up keyword is not included in the voice information, calculating similarity of the voice information if the distance between any two positions do not exceed a preset threshold, and determining the information of number of the user according to the similarity of the voice information acquired through calculation and the position information of the user.

Optionally, a voiceprint recognition algorithm is combined to identify that there are a plurality of users in the current application scenario.

It should be noted that, since the users will move back and forth, it may not be completely determined that N users are existed in the current application scenario if the position information includes N different positions. In order to more accurately determine the users' quantity in the current application scenario, and then switch into a corresponding mode for playing, in the embodiment of the present application, the similarity of the voice information is calculated when the distance between any two positions do not exceed the preset threshold. If the similarity of the voice information between two positions is relatively high (for example, higher than a preset value), the users located at the two positions that do not exceed the preset threshold are regarded as the same user, and the above process is repeated until the judgment of the users at all positions is completed, and then the information of number of the user is generated, where N is an integer greater than one.

Optionally, the information of number of the user is acquired by the camera.

S404: controlling the wireless speaker to switch into a third play mode or a fourth play mode, if the user's number meets the second preset condition and the positions of the users are all at the same side of the wireless speaker.

Where, the third play mode is a cinema mode, and the fourth play mode is a stereo mode. The cinema mode is mainly used to simulate the effect of the cinema, and to provide the users with a sense of surround stereo; the stereo mode is to process the audio data by the left and right channels separately and then output to different loudspeakers to achieve a stereo effect.

It should be understood that the wireless speaker can determine whether the users are located at the same side of the wireless speaker by comparing its position with the position information of the users.

Take a specific application scenario as an example. When a group of children are playing near the sofa and the wireless speaker is playing a children's song, after acquiring their voice information through the microphone array, and finding that there are a plurality of children and they are all at the same side of the wireless speaker through analysis, the wireless speaker automatically switches into the stereo mode or the cinema mode.

In the embodiment of the present application, the face images of the users in the current application scenario is acquired by the camera, the facial features from the face images are extracted, and the age information of the users is determined according to the facial features. Further, the voice information of the users in the current application scenario is acquired by the microphone array if the age information of the users does not meet the first preset condition, and the position information of the users is determined based on the voice information if the preset wake-up keyword is not included in the voice information. Further, if the distance between any two positions does not exceed the preset threshold, the similarity of the voice information is calculated, and the information of number of the users is determined according to the similarity of voice information acquired through calculation and the position information of the users. Moreover, if the quantity of the users meets the second preset condition, and the positions of the users are all at the same side of the wireless speaker, then the wireless speaker is controlled to switch into the third play mode or the fourth play mode. The speaker can automatically switch into the corresponding play mode directly with the change of the environment, which reduces the dependence on the users, improves the switching efficiency, gives users a better sense of experience, as well as has strong ease of use and practicality.

Fifth Embodiment

Figure 5:
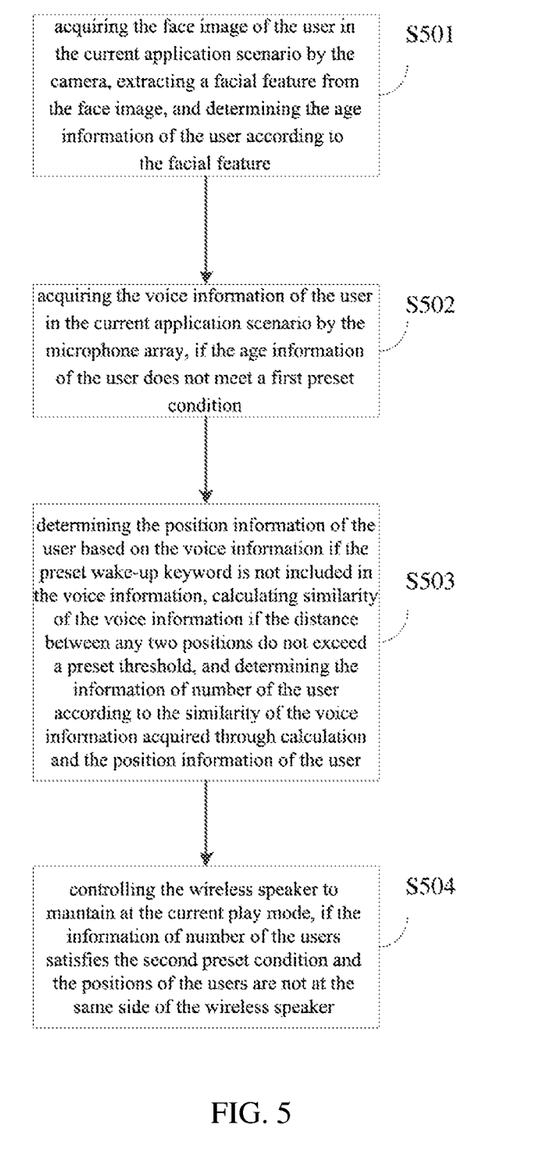
FIG. 5 is a schematic flowchart of the method for switching play modes of a wireless speaker provided by a fifth embodiment of the present application.

FIG. 5 is a schematic flowchart of the method for switching play modes of a wireless speaker provided by the fourth Embodiment of the present application, which is still another refinement and description of the steps S101 and S102 in the first embodiment, and the method may include the following steps of:

S501: acquiring the face image of the user in the current application scenario by the camera, extracting a facial feature from the face image, and determining the age information of the user according to the facial feature.

S502: acquiring the voice information of the user in the current application scenario by the microphone array, if the age information of the user does not meet a first preset condition.

S503: determining the position information of the user based on the voice information if the preset wake-up keyword is not included in the voice information, calculating similarity of the voice information if the distance between any two positions do not exceed a preset threshold, and determining the information of number of the user according to the similarity of the voice information acquired through calculation and the position information of the user.

Where, the above steps S501-S503 are the same as steps S401-S403 of the fourth embodiment, and are not described herein again.

S504: controlling the wireless speaker to maintain at the current play mode, if the information of number of the users satisfies the second preset condition and the positions of the users are not at the same side of the wireless speaker.

Where, the current play mode is a 360-degree mode which is a default play mode of the wireless speaker, and the 360-degree mode is an omnidirectional play mode, thereby enabling the users to hear the same acoustical quality effect in various directions.

Take a specific application scenario as an example. During a weekend party, the wireless speaker is disposed on a tea table at the middle of the living room, all the friends and family are sitting around the sofa and listening to music while communicating, the children are running and playing in the living room and dining room, and moms are preparing meals in the dining room. The wireless speakers identifies, by the microphone array, that the current application scene contains a plurality of users from different directions, and maintains at the current 360-degree mode to continue playing music.

In the embodiment of the present application, the face image of the users in the current application scenario is acquired by the camera, the facial features from the face image are extracted, and the age information of the users is determined according to the facial features. The voice information of the users in the current application scenario is acquired by the microphone array if the age information of the users does not meet the first preset condition, and the position information of the users is determined based on the voice information if the preset wake-up keyword is not included in the voice information. Further, if the distance between any two positions does not exceed the preset threshold, the similarity of the voice information is calculated, and the information of number of the users is determined according to the similarity of the voice information acquired through calculation and the position information of the users. If the information of number of the users satisfies the second preset condition, and the positions of the users are not at the same side of the wireless speaker, then the wireless speaker is controlled to maintain at the current play mode. After identifying that the users in the application scenario are from different directions respectively, the speaker may continue to maintain at the default play mode for playing, which reduces the switching frequency of the wireless speakers, and provides the users with continuous play effect while extending the service life of the wireless speaker at the same time, thereby improving the user experience, and having strong ease of use and practicability.

Sixth Embodiment

Figure 6:
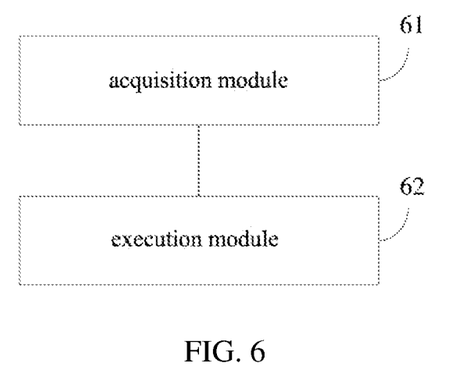
FIG. 6 is a schematic flowchart of the device for switching play modes of a wireless speaker provided by a sixth embodiment of the present application.

FIG. 6 is a structural schematic diagram of the device for switching play modes of a wireless speaker provided by the sixth embodiment of the present application. For convenience of description, only parts related to the embodiment of the present application are shown.

The device for switching play modes of a wireless speaker may be a software unit, a hardware unit or a unit combining the software and the hardware arranged inside the wireless speaker, or may be integrated into the wireless speaker as a separate pendant.

The device for switching play modes of a wireless speaker includes:

an acquisition module 61, configured to acquire user information in a current application scenario by a camera and/or a microphone array; and an execution module 62, configured to control the wireless speaker to switch into a play mode corresponding to the user information;

where the wireless speaker includes the camera and the microphone array, and the user information includes at least one of the following: age information of the user, voice information of the user, position information of the user, and information of number of the user.

Optionally, the acquisition module 61 specifically includes:

a first acquisition module, configured to acquire, by the camera, a face image of the user in the current application scenario, extract a facial feature from the face image, determine age information of the user according to the facial feature, and use the age information of the user as the user information in the current application scenario;

a second acquisition unit, configured to acquire, by the microphone array, voice information of the user in the current application scenario if the age information of the user does not meet a first preset condition;

a third acquisition unit, configured to determine, according to the voice information, position information of the user if the age information of the user does not meet the first preset condition and the voice information does not include a preset wake-up keyword, and calculate similarity of the voice information if the distance between any two positions does not exceed a preset threshold, and determine information of number of the user according to the similarity of the voice information acquired through calculation and the position information of the user.

Optionally, the execution module 62 specifically includes:

a first execution unit, configured to control the wireless speaker to switch into a first play mode corresponding to the age information if the age information of the user meets the first preset condition, where the first play mode is an elderly mode;

a second execution unit, configured to control the wireless speaker to switch into a second play mode corresponding to the voice information if the voice information includes the preset wake-up keyword, where the second play mode is a follow mode;

a third execution unit, configured to control the wireless speaker to switch into a third play mode or a fourth play mode if the quantity of the users meets the second preset condition and the positions of the users are all at the same side of the wireless speaker, where the third play mode is a cinema mode, and the fourth play mode is a stereo mode; and a fourth execution unit, configured to control the wireless speaker to maintain at a current play mode if the information of number of the users meets the second preset condition and the positions of the users are not at the same side of the wireless speaker, where the current play mode is a 360-degree mode.

Seventh Embodiment

Figure 7:
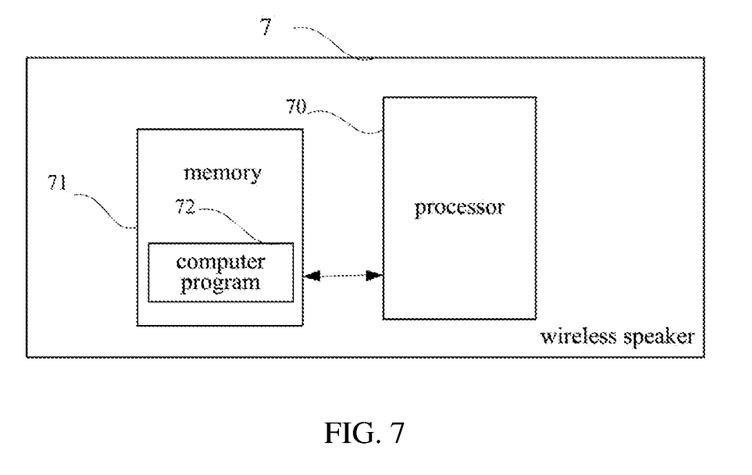
FIG. 7 is a structural schematic diagram of the wireless speaker provided by a seventh embodiment of the present application.

FIG. 7 is a structural schematic diagram of the wireless speaker provided by the seventh embodiment of the present application. As shown in FIG. 7, the Bluetooth speaker 7 of the present embodiment includes: a processor 70, a memory 71 and a computer program 72 stored in the memory 71 and executable by the processor 70. The processor 70, when executing the computer program 72, implements the steps of the first embodiment of the foregoing method, for example, from step S101 to step S102 as shown in FIG. 1; or implements the steps of the second embodiment of the foregoing method, for example, from step S201 to step S202 as shown in FIG. 2; or implements the steps of the third embodiment of the foregoing method, for example, from step S301 to step S303 as shown in FIG. 3; or implements the steps of the fourth embodiment of the foregoing method, for example, from step S401 to step S404 as shown in FIG. 4; or implements the steps of the fifth embodiment of the foregoing method, for example, from step S501 to step S504 as shown in FIG. 5. The processor 70, when executing the computer program 72, implements the functions of the various modules/units of the embodiments concerning the above various devices, for example, the functions of the modules 61 and module 62 as shown in FIG. 3.

Illustratively, the computer program 72 may be divided into one or more modules/units that are stored in the memory 71 and executed by the processor 70, so as to complete the present application. The one or more modules/units may be a series of computer program instruction segments capable of performing a particular function, and the instruction segments are used to describe the execution process of the computer program 72 in the wireless speaker 7. For example, the computer program 72 may be divided into an acquisition module and an execution module, and the specific function of each of the modules is as follows:

the acquisition module is configured to acquire user information in a current application scenario by a camera and/or a microphone array; and the execution module is configured to control the wireless speaker to switch into a play mode corresponding to the user information.

The wireless speaker may include, but is not limited to, a processor 70 and a memory 71. It will be understood by those skilled in the art that FIG. 7 is only an example of the wireless speaker 7 and does not constitute a limitation of the wireless speaker 7, which may include more or less components than those illustrated, or combine some components or different components. For example, the wireless speaker may further include an input device/output device, a network access device, a bus, and the like.

The processor 70 may be a central processing unit (CPU), or may be another general-purpose processor, digital signal processor (DSP), application specific integrated circuit (ASIC), field-programmable gate array (FPGA), or other programmable logic device, discrete gate or transistor logic device, discrete hardware component, etc. The general-purpose processor may be a microprocessor, or the processor may be any conventional processor or the like.

The memory 71 may be an internal storage unit of the wireless speaker 7, such as a hard disk or an internal storage of the wireless speaker 7. The memory 71 may also be an external storage device of the wireless speaker 7, for example, a plug-in hard disk, a smart memory card (SMC), a secure digital (SD) card, and a flash card etc. provided on the wireless speaker 7. Further, the memory 71 may also include both an internal storage unit and an external storage device of the wireless speaker 7. The memory 71 is used to store the computer program and other programs and data required by the wireless speaker. The memory 71 may also be used to temporarily store data that has been output or is about to be output.

It will be clearly understood by a person skilled in the art that, for the convenience and brevity of the description, the specific operating process of the system, the device and the unit described above may refer to the corresponding process of the embodiments concerning the foregoing method, and details of which are not described herein again.

In the above embodiments, each of the embodiments is described with particular emphasis, and the part that is not detailed or described in certain embodiment may be referred to related description of other embodiments.

Those of ordinary skill in the art will appreciate that, the modules, the units, and/or the steps of the method of each embodiment described in combination with the embodiments disclosed herein can be implemented by electronic hardware, or a combination of computer software and electronic hardware. It will depend on the specific application and design constraints of the technical solutions whether these functions are performed in the form of hardware or software. A person skilled in the art can use different methods to implement the described functions for each particular application, but such implementation should not be considered to be beyond the scope of the present application.

In the several embodiments provided by the present application, it should be understood that, the disclosed system, device and method may be implemented in other manners. For example, the embodiments concerning the device described above are merely illustrative. For example, the division of the units is only a division of logical functions, and there may be another division manner during actual implementation. For example, a plurality of units or components may be combined or may be integrated into another system, or some features may be ignored or not executed. In addition, the mutual coupling or direct coupling or communication connection as shown or discussed may be an indirect coupling or communication connection through some interfaces, devices or units, and may be electrically connected, mechanically connected or other forms.

The units described as separate components may or may not be physically separated, and the components displayed as units may or may not be physical units, that is, it may be located in one place, or may be distributed to a plurality of network units. Some or all of the units may be selected according to actual needs to achieve the purpose of the solutions of the embodiments.

In addition, each of the functional units in each embodiment of the present application may be integrated into one processing unit, or each of the units may exist physically separately, or two or more units may be integrated into one unit. The above integrated unit can be implemented in the form of hardware or in the form of a software functional unit.

The integrated unit, if implemented in the form of the software functional unit and sold or used as a standalone product, may be stored in a computer readable storage medium. Based on such understanding, in the present application, that implement all or part of the processes in the foregoing embodiments may also be completed through instructing related hardware by the computer program. The computer program may be stored in the computer readable storage medium, and the computer program, when executed by the processor, may implements the steps of each of the embodiments of the method described above. Where, the computer program includes computer program code, which may be in the form of source code, object code, executable file or some intermediate forms. The computer readable medium may include any entity or device, recording medium, USB flash disk, mobile hard disk drive, magnetic disk, optical disk, computer memory, read-only memory (ROM), random access memory (RAM), electrical carrier signal, telecommunication signal or software distribution media etc. capable of carrying the computer program code. It should be noted that, the content contained in the computer readable medium may be appropriately added or removed according to the requirements of legislation and patent practice in a jurisdiction, for example, in some jurisdictions, the computer readable medium does not include electrical carrier signals and telecommunication signals according to the legislation and patent practice.

In the above description, the above embodiments are only used to illustrate the technical solutions of the present application, and are not intended to be limiting. Although the present application has been described in detail with reference to the foregoing embodiments, those of ordinary skill in the art will understand that: the technical solutions described in the above embodiments may still be modified, or a part of the technical features in the embodiments may be substituted by equivalents. These modifications and substitutions will not depart the nature of corresponding technical solutions from the spirit and scope of the technical solutions of the various embodiments of the present application.

What is claimed is:

1. A method for switching play modes of a wireless speaker comprising a camera and a microphone array, the method comprising:
    providing the wireless speaker;
    acquiring user information in a current application scenario with the camera and/or the microphone array of the wireless speaker,
    wherein the user information comprises age information of the user, voice information of the user, and position information of the user;
    controlling the wireless speaker to switch into a first play mode in response to the age information of the user meeting a first preset condition, wherein the first preset condition is that the age of the user is greater than or equal to 65 years old, wherein the first play mode is an elderly mode in which gain of a predetermined frequency of the wireless speaker to which the user is not sensitive is increased in a fixed direction;
    determining the position information of the user in response to a preset wake-up keyword not being detected in the voice information; and
    controlling the wireless speaker to switch into a second play mode in response to the preset wake-up keyword being detected in the voice information, wherein the second play mode is a follow mode in which the direction of the wireless speaker follows the source direction of the user's voice and the wireless speaker is configured to be consulted for a topic of interest when under the follow mode.

2. The method of claim 1, wherein the age information is acquired with the camera through the following steps:
    acquiring a face image of the user in the current application scenario by the camera;
    extracting a facial feature from the face image; and
    determining the age information of the user according to the facial feature, and taking the age information of the user as the user information in the current application scenario.

3. The method of claim 1, wherein, after the step of determining position information of the user based on the voice information, the method further comprises:
    calculating similarity of the voice information when the distance between any two positions does not exceed a preset threshold;

determining quantity information of the user according to the similarity of the voice information acquired through calculation and the position information of the user; and controlling the wireless speaker to switch into a third play mode or a fourth play mode when the quantity of the user meets a second preset condition and the positions of the user are all at a same side of the wireless speaker, wherein the third play mode is a cinema mode and the fourth play mode is a stereo mode; and controlling the wireless speaker to maintain at a current play mode when the quantity information of the user satisfies the second preset condition and the positions of the user are not at the same side of the wireless speaker, wherein the current play mode is a 360-degree mode.

4. The method of claim 3, wherein the cinema mode is configured to simulate the effect of a cinema so as to provide the user with a sense of surround stereo, the stereo mode is configured to process the audio data by a left channel and a right channel separately and then output to different loudspeakers to achieve a stereo effect.

5. A device for switching play modes of a wireless speaker comprising a camera and a microphone array, the device comprising:

an acquisition module, configured to acquire user information in a current application scenario with the camera and/or the microphone array; and an execution module, configured to control the wireless speaker to switch into a play mode corresponding to the user information;

wherein the user information comprises age information of the user, voice information of the user, and position information of the user;

wherein the execution module comprises:

a first execution unit, configured to control the wireless speaker to switch into a first play mode in response to the age information of the user meeting a first preset condition, wherein the first preset condition is that the age of the user is greater than or equal to 65 years old, and wherein the first play mode is an elderly mode in which gain of a predetermined frequency of the wireless speaker to which the user is not sensitive is increased in a fixed direction;

wherein the acquisition module comprises:

a first acquisition unit, configured to acquire, by the microphone array, voice information of the user in the current application scenario in response to the age information of the user not meeting the first preset condition;

wherein the execution module further comprises:

a second execution unit, configured to control the wireless speaker to switch into a second play mode in response to a preset wake-up keyword being detected in the voice information, wherein the second play mode is a follow mode in which the direction of the wireless speaker follows the source direction of the user's voice and the wireless speaker is configured to be consulted for a topic of interest when under the follow mode;

wherein the acquisition module further comprises:

a second acquisition unit, configured to acquire position information of the user in response to the preset wake-up keyword not being detected in the voice information.

6. The device of claim 5, wherein the acquisition module further comprises:

a third acquisition unit, configured to acquire, by the camera, a face image of the user in the current application scenario, to extract a facial feature from the face image, to determine the age information of the user according to the facial feature, and to use the age information of the user as the user information in the current application scenario;

wherein the second acquisition unit is further configured to calculate similarity of the voice information when the distance between any two positions does not exceed a preset threshold, and determine quantity information of the user according to the similarity of the voice information acquired through calculation and the position information of the user.

7. The device of claim 6, wherein the execution module further comprises:

a third execution unit, configured to control the wireless speaker to switch into a third play mode or a fourth play mode when the quantity information of the user meets a second preset condition and the positions of the user are all at a same side of the wireless speaker, wherein the third play mode is a cinema mode and the fourth play mode is a stereo mode; and a fourth execution unit, configured to control the wireless speaker to maintain at a current play mode when the quantity information of the user meets the second preset condition and the positions of the user are not at the same side of the wireless speaker, wherein the current play mode is a 360-degree mode.

8. The device of claim 5, wherein the wireless speaker is a Wi-Fi speaker.

9. The device of claim 5, wherein the microphone array is distributed around a shell of the wireless speaker.

10. A wireless speaker, comprising a memory, a processor and a computer program stored in the memory and executable by the processor, wherein the processor, when executing the computer program, implements the steps of:

acquiring user information in a current application scenario with a camera and/or a microphone array of the wireless speaker, wherein the user information comprises age information of the user, voice information of the user, and position information of the user;

controlling the wireless speaker to switch into a first play mode in response to the age information of the user meeting a first preset condition, wherein the first preset condition is that the age of the user is greater than or equal to 65 years old, wherein the first play mode is an elderly mode in which gain of a predetermined frequency of the wireless speaker to which the user is not sensitive is increased in a fixed direction;

acquiring voice information of the user in the current application scenario with the microphone array in response to the age information of the user not meeting the first preset condition;

determining position information of the user in response to a preset wake-up keyword not being detected in the voice information; and controlling the wireless speaker to switch into a second play mode in response to the preset wake-up keyword being detected in the voice information, wherein the second play mode is a follow mode in which the direction of the wireless speaker follows the source direction of the user's voice and the wireless speaker is configured to be consulted for a topic of interest when under the follow mode.

11. The wireless speaker of claim 10, wherein the step, implemented by the processor, of acquiring the age information by the camera comprises:
    acquiring a face image of the user in the current application scenario by the camera;
    extracting a facial feature from the face image; and
    determining the age information of the user according to the facial feature, and taking the age information of the user as the user information in the current application scenario.

12. The wireless speaker of claim 10, wherein, after the step, implemented by the processor, of determining position information of the user in response to a preset wake-up keyword not being detected in the voice information, the processor, when executing the computer program, further implements the steps of:
    calculating similarity of the voice information when the distance between any two positions does not exceed a preset threshold;
    determining quantity information of the user according to the similarity of the voice information acquired through calculation and the position information of the user; and
    controlling the wireless speaker to switch into a third play mode or a fourth play mode when the quantity of the user meets a second preset condition and the positions of the user are all at a same side of the wireless speaker, wherein the third play mode is a cinema mode and the fourth play mode is a stereo mode; and
    controlling the wireless speaker to maintain at a current play mode when the quantity information of the user satisfies the second preset condition and the positions of the user are not at the same side of the wireless speaker, wherein the current play mode is a 360-degree mode.

\* \* \* \* \*